United States Patent
Vaitheeswaran et al.

(10) Patent No.: US 8,527,556 B2
(45) Date of Patent: Sep. 3, 2013

(54) SYSTEMS AND METHODS TO UPDATE A CONTENT STORE ASSOCIATED WITH A SEARCH INDEX

(75) Inventors: Ganesh Vaitheeswaran, Bangalore (IN); Arindam Bhattacharejee, Bangalore (IN); Raghavendra Reddy Bijjula, Bangalore (IN)

(73) Assignee: Business Objects Software Limited, Dublin (IE)

( * ) Notice: Subject to any disclaimer, the term of this patent is extended or adjusted under 35 U.S.C. 154(b) by 93 days.

(21) Appl. No.: 12/890,939

(22) Filed: Sep. 27, 2010

(65) Prior Publication Data

US 2012/0078859 A1 Mar. 29, 2012

(51) Int. Cl.
*G06F 17/30* (2006.01)
(52) U.S. Cl.
USPC ........... 707/812; 707/693; 707/711; 707/741; 707/830
(58) Field of Classification Search
USPC ................ 707/600, 603, 705, 706, 722, 723, 707/728, 736, 748, 749, 750, 752, 758, 769, 707/776, 709, 711, 726, 741, 742, 830, 917, 707/953, 693, 812
See application file for complete search history.

(56) References Cited

U.S. PATENT DOCUMENTS

| | | | |
|---|---|---|---|
| 6,910,040 B2 * | 6/2005 | Emmick et al. | 1/1 |
| 7,725,453 B1 * | 5/2010 | Chen et al. | 707/711 |
| 7,941,431 B2 * | 5/2011 | Bluhm et al. | 707/736 |
| 8,041,074 B2 * | 10/2011 | Rhoads et al. | 382/100 |
| 2004/0205044 A1 * | 10/2004 | Su et al. | 707/2 |
| 2004/0236801 A1 * | 11/2004 | Borden et al. | 707/204 |
| 2005/0289106 A1 * | 12/2005 | Petri et al. | 707/1 |
| 2006/0080316 A1 * | 4/2006 | Gilmore et al. | 707/9 |
| 2007/0112743 A1 * | 5/2007 | Giampaolo et al. | 707/3 |
| 2007/0260643 A1 * | 11/2007 | Borden et al. | 707/201 |
| 2007/0276823 A1 * | 11/2007 | Borden et al. | 707/5 |
| 2008/0033920 A1 * | 2/2008 | Colclasure et al. | 707/3 |
| 2008/0168037 A1 * | 7/2008 | Kapadia et al. | 707/3 |
| 2009/0006543 A1 * | 1/2009 | Smit | 709/203 |
| 2010/0205160 A1 * | 8/2010 | Kumar et al. | 707/696 |
| 2011/0047159 A1 * | 2/2011 | Baid et al. | 707/738 |
| 2011/0202541 A1 * | 8/2011 | Permandla et al. | 707/742 |
| 2011/0219008 A1 * | 9/2011 | Been et al. | 707/742 |
| 2011/0238653 A1 * | 9/2011 | Wang et al. | 707/709 |

* cited by examiner

*Primary Examiner* — Jean M Corrielus
*Assistant Examiner* — Evan Aspinwall
(74) *Attorney, Agent, or Firm* — Buckley, Maschoff & Talwalkar LLC

(57) ABSTRACT

Some aspects include determination of second document identifiers added to a search index. The search index associates each of a plurality of words with at least one of a plurality of first document identifiers. For each of the second document identifiers, metadata of a document identified by the second document identifier is added to a content store storing metadata of each document identified by the plurality of first document identifiers. In some aspects, the content store comprises at least one flat file, and the metadata is appended to an end of one or more of the at least one flat file.

21 Claims, 13 Drawing Sheets

SYSTEMS AND METHODS TO UPDATE A CONTENT STORE ASSOCIATED WITH A SEARCH INDEX

BACKGROUND

Index-based search systems have been developed to facilitate the identification of desired information within increasingly large quantities of electronic data. An index-based search of millions of electronic documents may produce a search result within a time that may be noticeable but acceptable, e.g., few seconds. A search result identifies relevant documents, and may also contain metadata such as a title and a description of the relevant documents, as well as snippets of relevant content.

The search index of an index-based search system typically contains structured files that store the contents of documents within field-value pairs. Such an index is often referred to as an "inverted index" because each record thereof contains a mapping from a unique word (i.e., a field) to a list (i.e., values) of document identifiers of all documents in the repository that contain this word. During operation, a search engine receives search terms, queries the search index to determine identifiers of documents which contain the search terms, and returns the documents identifiers in an order based on their relevance to the search terms.

An inverted index is optimized for quick response. For example, a search index may return a list of document identifiers in response to a search query within imperceptible time, e.g., tens of milliseconds. Once the list is returned, the identified documents are opened to retrieve the metadata and other fields (e.g., description, content snippets) to be returned in the search result. Opening the documents and retrieving information therefrom is by far the most time-consuming component of the search process.

In order to increase the speed at which this information is retrieved, some search systems store a blueprint of each stored document in a set of flat files, known as a content store. Using a content store, document information may be retrieved in tens of milliseconds. Document identifiers stored in the search index are used to reference corresponding document information from the content store.

Conventional systems require complete regeneration of a content store every time the search index is updated. In this regard, the document identifiers in the search index may change during an update to the search index, rendering the references in the content store invalid. By completely regenerating the entire content store each time the search index is updated, the content store references are always valid.

Moreover, the content store files are typically sequential in order to facilitate fast retrieval of information therefrom. However, using conventional techniques, updating the content store files based only on search index updates while maintaining the sequential nature of the files is often more time- and resource-consuming than simply regenerating the entire content store based on the entire search index.

Completely regenerating a content store in response to search index updates results in a significant delay between changes to a document repository and reflection of the changes within the content store. This delay is exacerbated over time because the time required to generate a content store scales poorly as the number of documents in the search index increases.

Systems are desired to efficiently update a content store based on changes to a search index. For example, systems are desired to efficiently update a content store in response to the addition, deletion and/or modification of document identifiers within a search index.

DETAILED DESCRIPTION

The following description is provided to enable any person in the art to make and use the described embodiments and sets forth the best mode contemplated for carrying out some embodiments. Various modifications, however, will remain readily apparent to those in the art.

Figure 1:
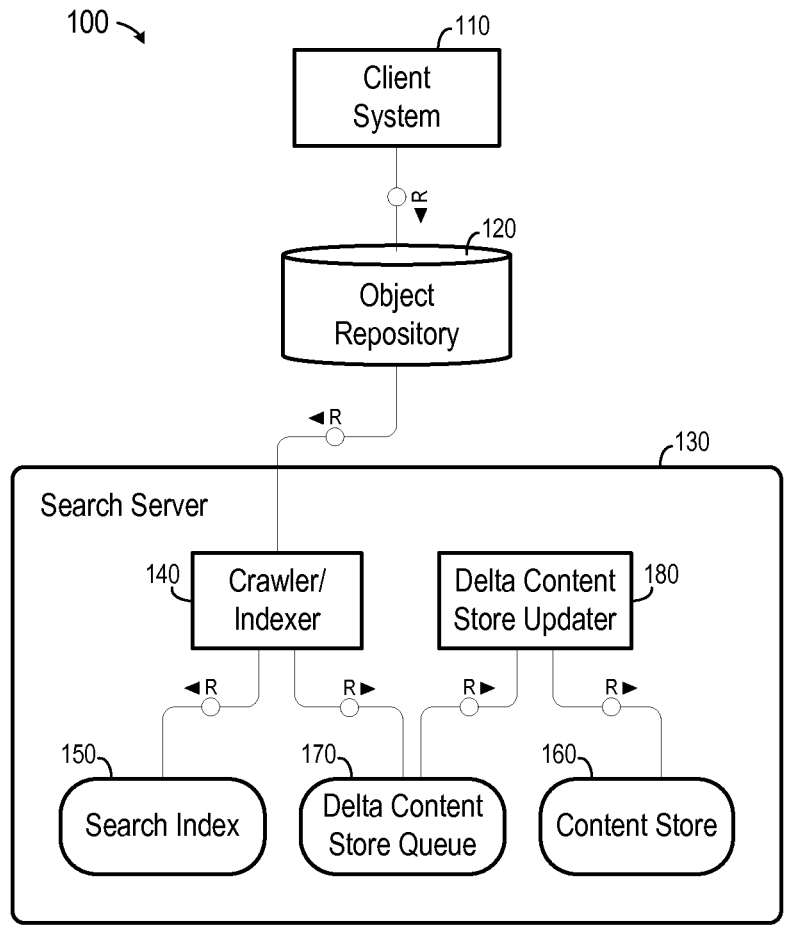
FIG. 1 is a block diagram of a system according to some embodiments.

Some embodiments may be implemented within a hardware architecture such as that shown in FIG. 1. System 100 may represent any system providing search functionality. System 100 includes client system 110, object repository 120 and search server 130. In general operation, client system 110 submits a search query and, in response, search server 130 provides a search result identifying one or more objects of object repository 120. As described above, the search result may identify the one or more objects and include metadata and/or other information of the identified objects.

Although FIG. 1 depicts a search query passing from client system 110 to search server 130 via object repository 120, a search query may pass from client system 110 to search server 130 through other or additional functional components according to some embodiments. In this regard, embodiments are not limited to the architecture of system 100.

Client system 110 may comprise any suitable device, such as a desktop computer, a laptop computer, a personal digital assistant, a tablet PC, and a smartphone. Client system 110 may, for example, execute program code of a rich client application or a Web-browser to provide the functions attributed thereto herein.

Object repository 120 may comprise any one or more storage devices storing objects. The objects may comprise files of any type, including but not limited to Web pages, word processing documents, spreadsheets, Portable Document Format (PDF) documents, etc. In some embodiments, object repository 120 is a repository of a Business Intelligence (BI) system storing BI reports and other BI objects. According to the description below, a report object may include one or more documents, such as text, tables, etc.

Search server 130 includes crawler/indexer 140 and search index 150. Crawler/indexer 140 identifies objects of object repository 120 to be indexed, and indexes the objects in search index 150. For example, crawler/indexer 140 may identify new or modified objects within object repository 120. For each new or modified object of a particular format (e.g., .doc, .pdf, .wid), crawler/indexer 140 executes an extractor associated with the particular format to extract information from the document. The extracted information is used to update search index 150.

As described in the above Background, such updating may include associating document identifiers of the new or modified objects with existing words in search index 150, and/or entering new words (i.e., fields) in search index 150 and associating document identifiers of the new or modified objects with the new words.

Content store 160 is a set of flat files storing metadata and other information of each indexed document. A detailed example of an implementation of content store 160 will be described below with respect to FIGS. 2, 3A and 3B.

Delta content store queue 170 includes a list of document identifiers based on which content store 160 should be updated. In some embodiments, crawler/indexer 140 adds a document identifier to delta content store queue 170 each time a document is indexed in search index 150. Accordingly, in response to adding or modifying a document in object repository 120, crawler/indexer 140 indexes the document in search index 150 and adds an identifier of the document to delta content store queue 170.

Content store updater 180 updates content store 160 based on delta content store queue 170. Details of the update process according to some embodiments are described below. The update process may, according to some embodiments, eliminate the need to completely regenerate content store 160 each time search index 150 is updated.

Crawler/indexer 140 and/or content store updater 180 may be implemented in program code executed by a processor of search server 130. Search index 150 and content store 160 may be stored in any one or more common or separate electronic storage elements, including but not limited to Random Access Memory, cache memory, a hard drive, etc. The components of search server 130 (and of system 100 in general) may be embodied in any number of common or separate devices, using any suitable combination of hardware and/or software.

Figure 2:
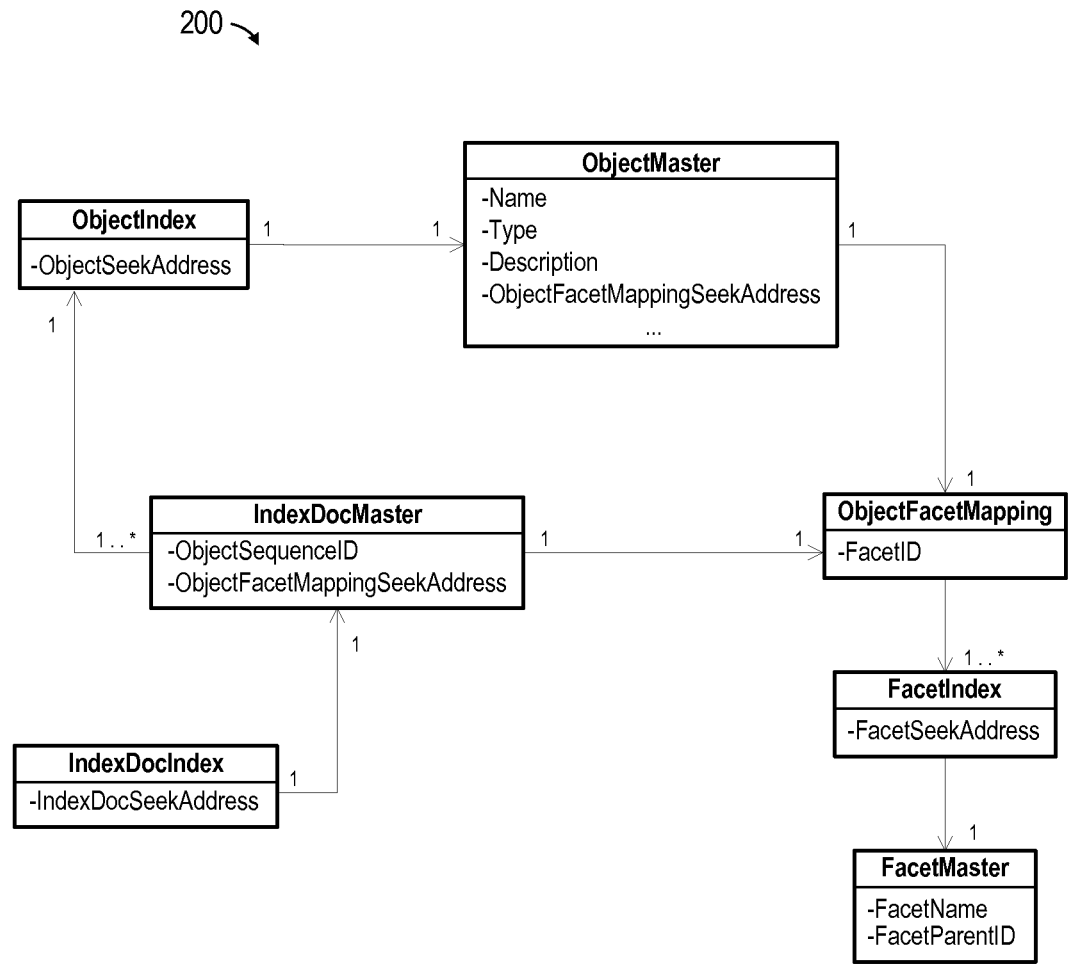
FIG. 2 is a diagram of a content store schema according to some embodiments.

FIG. 2 illustrates schema 200 of a content store according to some embodiments. For example, the files of content store 160 may conform to schema 200.

During indexing, objects stored in an object repository may be split into their constituent parts, such as tables and charts, and each constituent part is independently indexed. Each constituent part will be referred to as a document. For example, a report object may include two tables, and each table will be represented by a unique document identifier in the search index and the content store.

Schema 200 includes seven files: ObjectIndex; ObjectMaster; IndexDocIndex; IndexDocMaster; ObjectFacetMapping; FacetIndex and FacetMaster.

The ObjectMaster file stores metadata records for each object in the object repository. The data structure of the ObjectMaster file permits the storage of any number of metadata fields. Each record in the ObjectMaster file includes a pointer, ObjectFacetMappingSeekAddress, to an address in the ObjectFacetMapping table that holds the list of facets for the corresponding object.

The facets of an object include the various fields of the object and their corresponding values. Some fields of a particular object (e.g., the Country column of a table) may be associated with several values (e.g., Canada, France), and these field-value associations may be reflected in the list of facets stored in the content store.

The ObjectIndex file stores the starting address of each object's record in the ObjectMaster table. In an embodiment, an object identifier is a unsigned 32 bit integer. If object identifiers are used to calculate the addresses of corresponding records in the ObjectMaster file, the ObjectMaster file will include a lot of unused addresses. Therefore, each object is assigned a sequence number, starting at 0, when its metadata is stored in the ObjectMaster file. The ObjectIndex file maintains the mapping between an object sequence number and its corresponding record in the ObjectMaster file.

The FacetMaster file stores information such as facet name and a parent facet id identifier for each unique facet. The FacetIndex file contains the starting address of each record in the FacetMaster file. Each unique facet is assigned a sequence number starting from 0 when it is stored in the FacetMaster file. Analogous to the ObjectIndex file, the FacetIndex file maintains mappings between the facet sequence number and the address of the facet's record in the FacetMaster file.

The IndexDocMaster file stores metadata about the index documents. Each record in the IndexDocMaster also has a pointer, called IndexDocFacetSeekAddress, to the address in the ObjectFacetMapping table that holds the list of facets for this document. The ObjectSequenceID of the object corresponding to this index document is also stored in the index document's record. The address stored at this pointer location points to the metadata record for this object in the ObjectMaster table.

The IndexDocIndex file maps each document identifier of the search index to a starting address of a record of an associated document in the IndexDocMaster file.

The ObjectFacetMapping file contains mappings between an object and the object-level facets for that object. Examples of object-level facets are object type (e.g., Webi, Crystal Report) and folder path. The ObjectFacetMapping file also contains mappings between a document identified in the search index and categories corresponding to that document. Each record in the ObjectFacetMapping file contains a list of FacetIDs (integers) terminated by −1.

The following example describes the population of content store files based on schema 200 according to some embodiments. The example considers two report objects:

Report 1
  Name: Resorts
  Description: Details about resorts such as resort name, city and country.
  Type: Web Intelligence Report
  Last Updated: 12 Jul. 2009
  ID: 1200

Report 1 contains one table, Resort Details, as shown below:

| Resort | Country |
| --- | --- |
| Bahamas Beach | U.S. |
| French Riviera | France |

Report 2
  Name: Customers
  Description: Details about customers such as customer name, city and country of origin.
  Type: Web Intelligence Report
  Last Updated: 10 Jun. 2009

ID: 1300
Report 2 contains one table, Customer Details, as shown below:

| Customer | Country |
|---|---|
| Arai | Japan |
| Baker | U.S. |

Figure 3A:
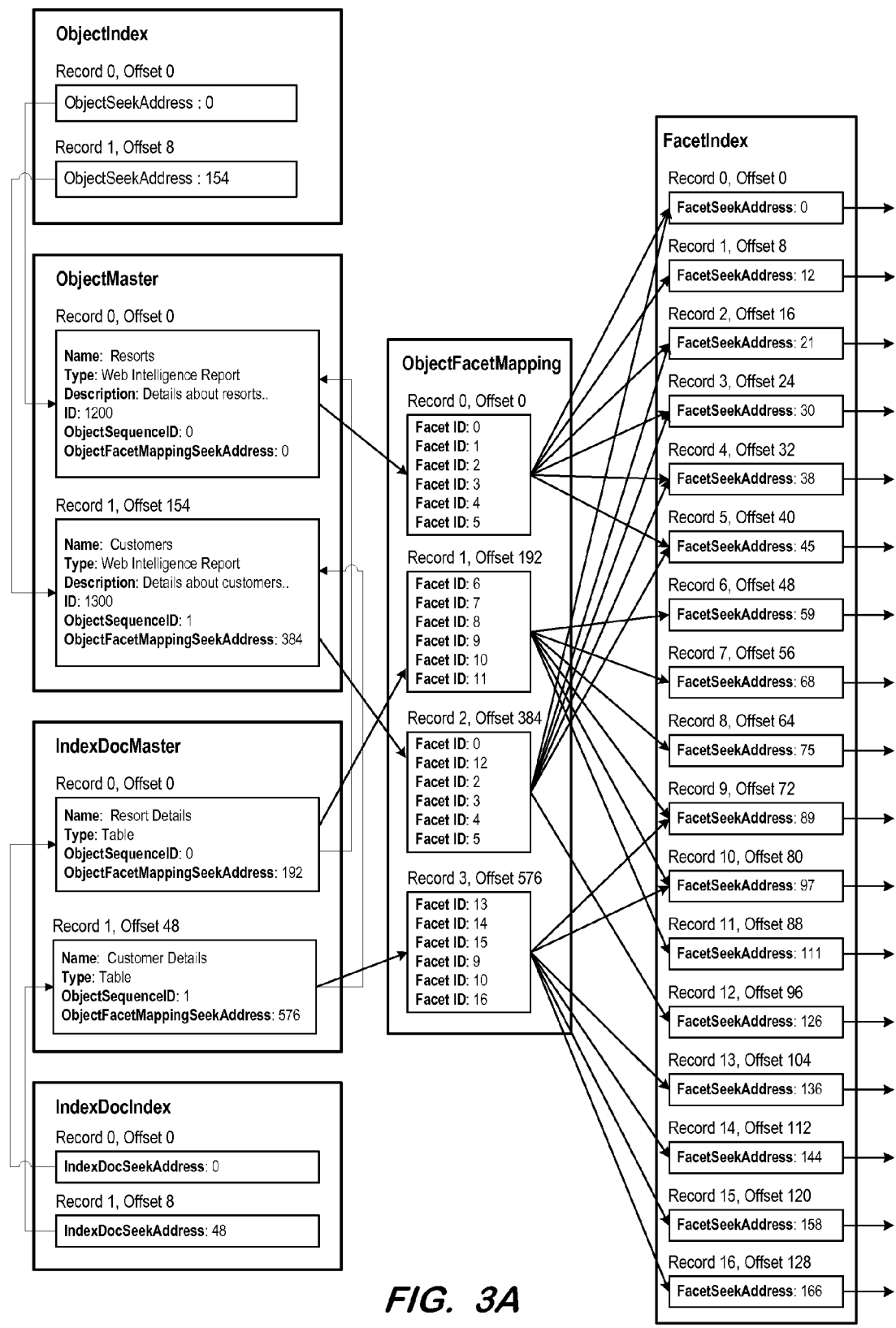
FIGS. 3A and 3B illustrate the storage and interrelationships of data within a content store according to some embodiments.
Figure 3B:
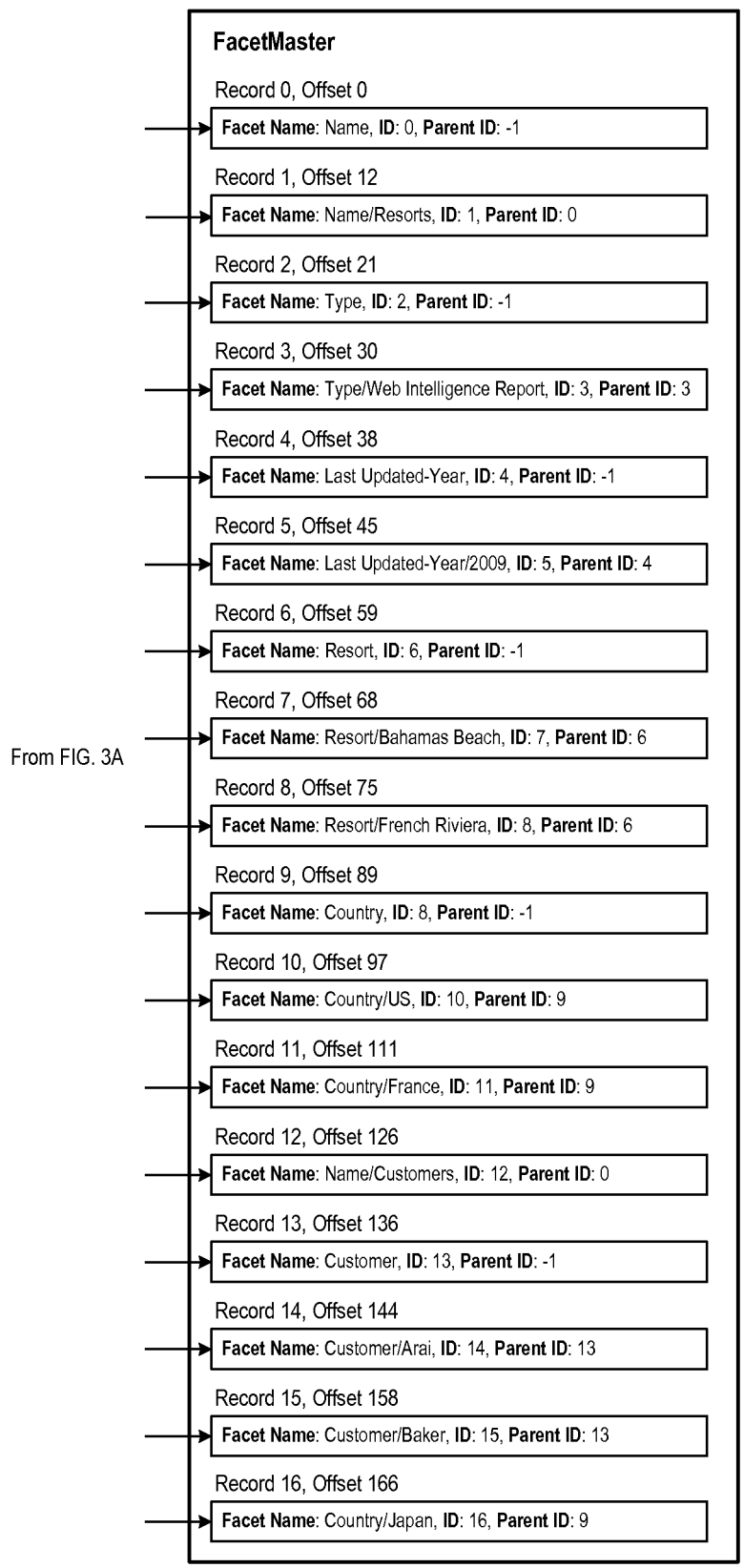

FIGS. 3A and 3B illustrate files of a content store generated based on these two reports. As shown, each report is considered a separate object, and each table is considered a separate document. However, an object and a document within that object share the same ObjectSequenceID.

Figure 4:
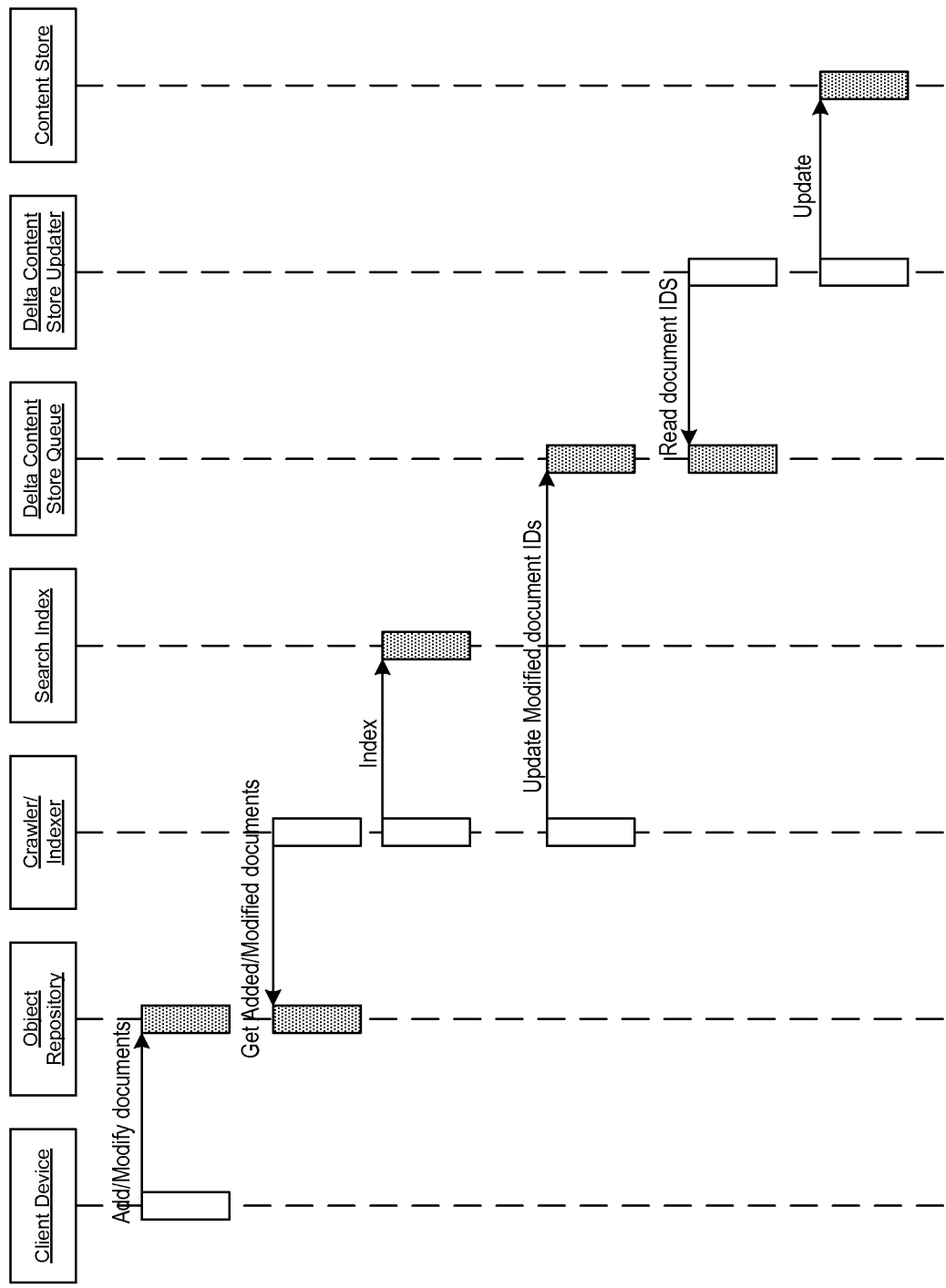
FIG. 4 is a sequence diagram of a process according to some embodiments.

FIG. 4 is a sequence diagram of a process according to some embodiments. The sequence diagram reflects the components of system 100, but the components of the sequence diagram may be configured differently than that of system 100. Embodiments are not limited to the components of FIGS. 1 and 4, or to the functions thereby attributed to each component.

Initially, a user operates a client device to add or modify a document stored in an object repository. For example, the user may operate a reporting tool executed by the client device to retrieve a report from the object repository. The user may then modify a table of the report and save the modified report back to the object repository using the reporting tool.

A crawler task (e.g., running on a search server) periodically crawls the object repository looking for new or modified documents. When new or modified documents are identified, an indexer indexes the contents of the documents within a search index. More specifically, the search index initially associates each of a plurality of words with at least one of a plurality of document identifiers. The indexer extracts the contents of the identified new or modified documents and adds document identifiers associated with the new or modified documents to the search index where appropriate.

The indexer also adds document identifiers associated with the new or modified documents to a delta content store queue. A delta content store updater periodically checks the delta content store queue for document identifiers. Accordingly, the delta content store updater determines document identifiers which have been added to the search index.

The delta content store updater reads the documents associated with the document identifiers of the delta content store queue. Metadata and/or other information of each read document is then added to a content store. Advantageously, updates to the search index do not require regeneration of the entire content store.

Figure 5:
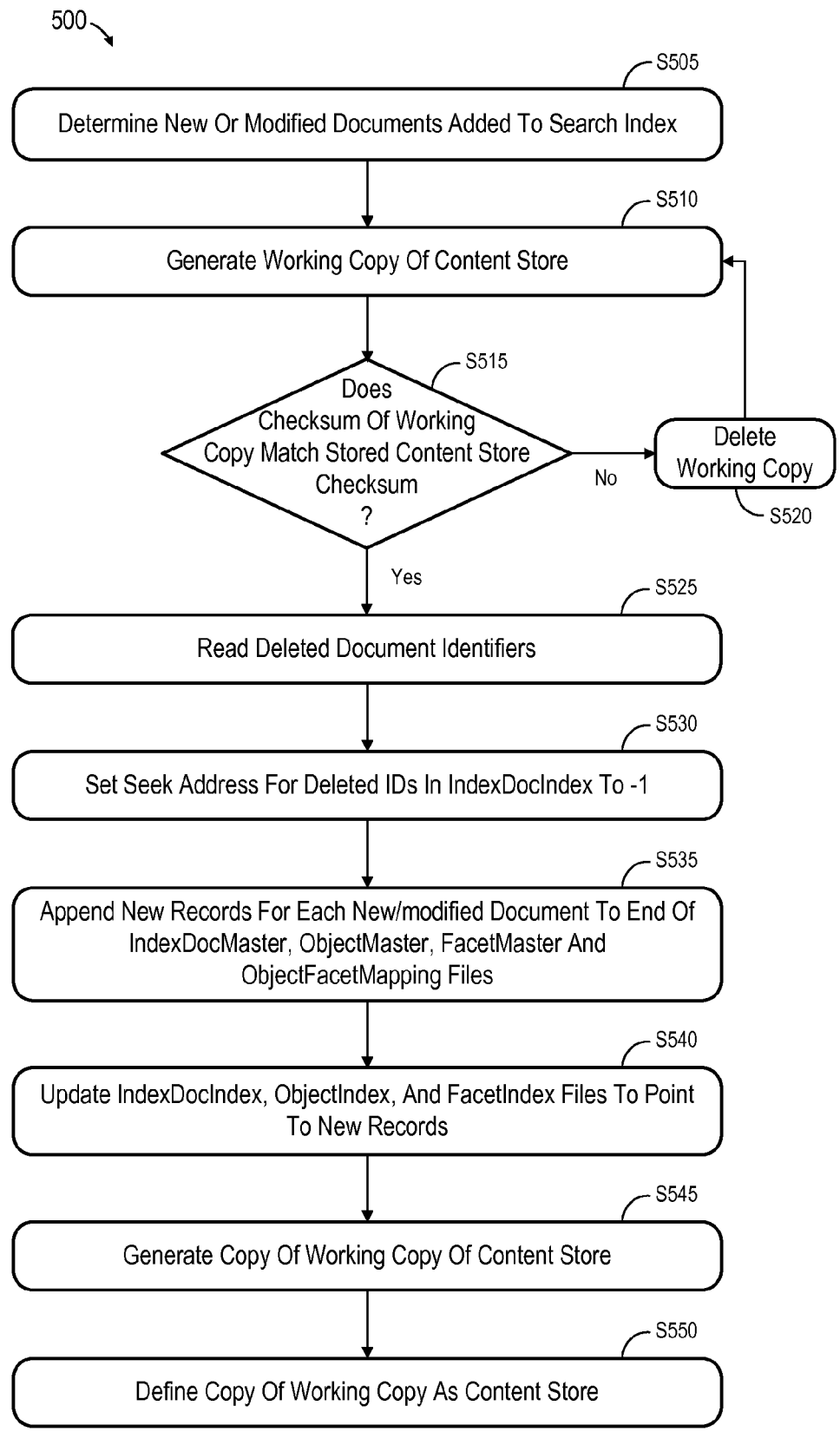
FIG. 5 is a flow diagram of a process according to some embodiments.

FIG. 5 is a flow diagram of process 500 according to some embodiments. Process 500, and all other process described herein, may be executed by hardware and embodied in program code stored on a non-transitory computer-readable medium. Process 500, and the other described processes, may be performed by one or more elements of system 100, such as delta content store updater 180, but embodiments are not limited thereto.

Generally, process 500 may be executed to update a content store based on updates to a corresponding search index, without requiring complete regeneration of the content store. Initially, at S505, new or modified documents added to the search index are detected. In some embodiments, the documents are detected by reading document identifiers from a delta content store queue generated as described above.

It is preferable to update the content store without pausing or otherwise affecting searches on the search index. Accordingly, a "working" copy of the content store is generated at S510. The working copy includes copies of each file of the content store (i.e., IndexDocIndex, IndexDocMaster, ObjectMaster, ObjectIndex, ObjectFacetMapping, FacetIndex, FacetMaster).

According to some embodiments, a checksum of each content store file was stored after a previous successful update to the content store. At S515, checksums of the working copy files are compared with the corresponding stored checksums to determine whether the working copy files are corrupted. If the checksums do not match, the working copy is deleted at S520 and flow returns to S510. Flow proceeds to S525 if the checksums match.

A portion of the indexing process will now be described to facilitate understanding of the next several steps of process 500. Specifically, when an object is modified or deleted in the object repository, the search index is searched for all document identifiers corresponding to this object. These document identifiers are written to a "deleted identifiers" file. Therefore, at S525, the deleted identifiers file is read and, for each identifier in the file, the seek address in the corresponding record of the IndexDocIndex file is set to −1 at S530. This seek address serves as a flag to indicate that the corresponding document should not be returned as a search result, even if the corresponding document identifier was selected from the search index based on a search query.

Next, at S535, new records are created in the IndexDocMaster, ObjectMaster, FacetMaster and ObjectFacetMapping files of the working copy of the content store. These records are simply appended to the end of these files to maintain the sequential nature of these files. Accordingly, the IndexDocIndex, ObjectIndex and FacetIndex files of the working copy are updated at S540 to point to the new records created at S535.

The working copy is copied at S545, and the copy of the working copy is defined as the latest version of the content store at S550. As mentioned above, checksums may be generated for each file of the content store and saved for use during a next content store update.

The objects in the delta content store queue are not deleted until the content store update is successful. If the update is not successful, the new content store can be generated from the latest "good" version because identifiers of the updated objects remain in the delta content store queue.

The search index must be optimized periodically in order to prevent the degradation of search response times. Optimization includes removal of all document identifiers specified in the deleted identifiers file. These document identifiers are associated with documents that have been deleted from the object repository, or that have been modified and are now represented by a different document identifier. After removing the identifiers, the search index is defragmented to improve search response times. However, defragmentation changes the document identifiers within the search index. The content store must be modified to account for these changed document identifiers, preferably without regenerating the entire content store.

Figure 6A:
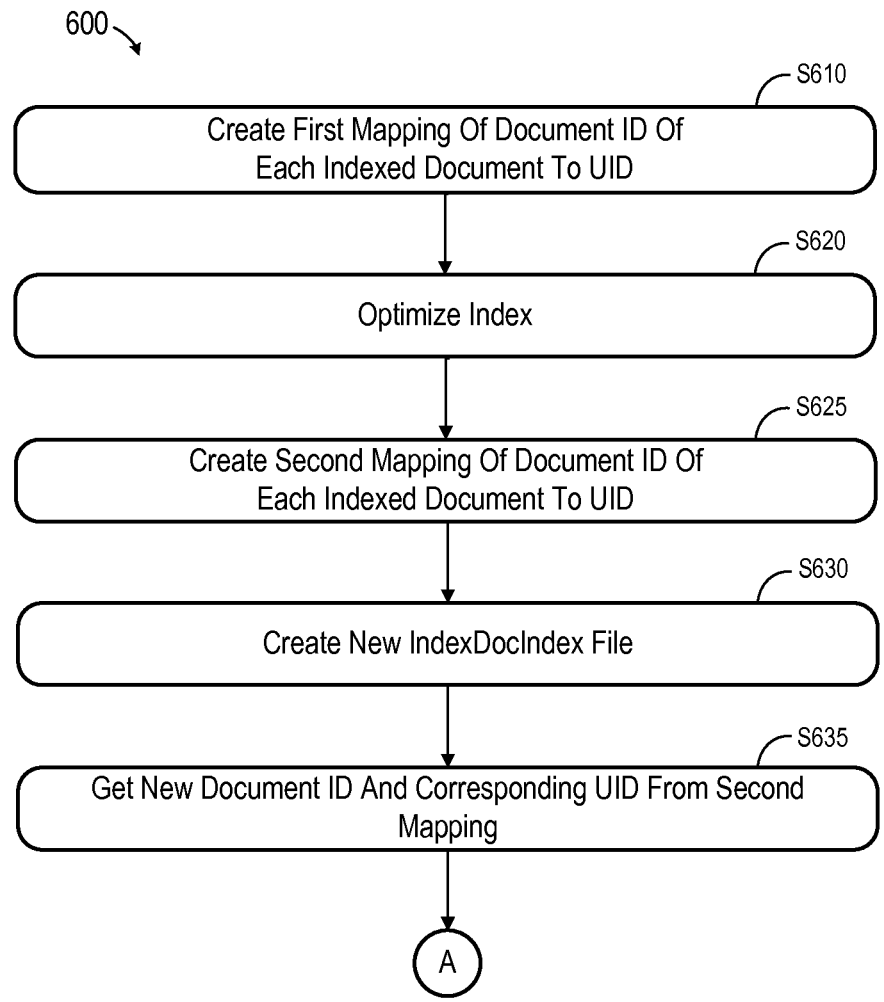
FIGS. 6A and 6B comprise a flow diagram associated with optimization of a search index according to some embodiments.
Figure 6B:
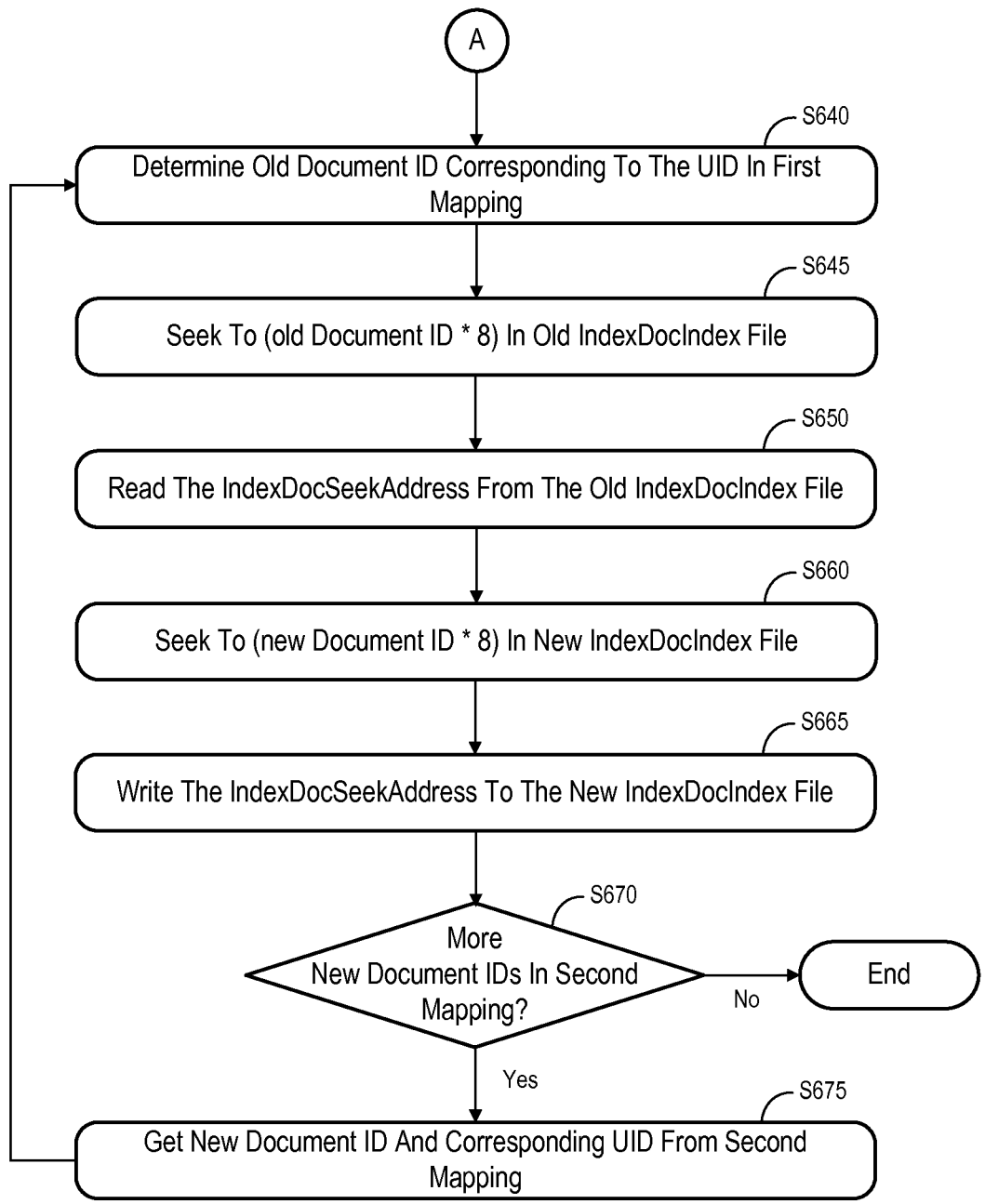

Process 600 of FIGS. 6A and 6B may be executed to maintain the validity of the content store references across index optimizations without regenerating the entire content store. Process 600 assumes that every indexed document is associated with a unique identifier (UID) which is stored in a field of the document. This UID does not change when the search index is optimized.

At S610, a first mapping of UIDs to document identifiers is created. The mapping includes the UID and document identifier of each document represented in the search index. The index is optimized at S620 to remove the document identifiers of the deleted identifiers file and to defragment the resulting search index. As mentioned above, defragmentation changes the document identifiers within the search index.

A second mapping of UIDs to document identifiers is created at S625. The mapping includes the UID and document identifier of each document represented in the optimized search index.

The remainder of process 600 populates a new IndexDocIndex file for the content store. The new IndexDocIndex file is intended to compensate for the changed document identifiers such that the changes are transparent to the remaining content store files.

The new IndexDocIndex file is created at S630. Next, at S635, a new document identifier and a corresponding UID are retrieved from the second mapping. A document identifier which corresponds to the retrieved UID is then determined from the first mapping at S640. The determined document identifier is the "old" (i.e., pre-optimization) identifier of the document corresponding to the retrieved UID.

The current process seeks to (old document identifier*8) in the old IndexDocIndex file to locate a record corresponding to the old document identifier at S645, and reads the IndexDocSeekAddress from the record of the old IndexDocIndex file at S650. The address (new document identifier*8) is located in the new IndexDocIndex file at S660, and the IndexDocSeekAddress read at S650 is written to this address in the new IndexDocIndex file.

At S670, it is determined whether the second mapping includes more document identifiers (and corresponding UIDs). If so, a new document identifier and corresponding UID are retrieved from the second mapping at S675 and flow returns to S640. If not, flow terminates.

As a result of process 600, a new document identifier associated with a document can be used to access data associated with the document in the content store, even if the document was associated with a different document identifier when the data was originally stored in the content store. According to the described implementation, the old document identifier pointed to a record of the old IndexDocIndex file which in turn pointed to a relevant record of the IndexDocMaster file. After execution of process 600, the new document identifier points to a record of the new IndexDocIndex file which points to the same relevant record of the IndexDocMaster file.

As described with respect to process 500, new records are added to the end of the IndexDocMaster, ObjectMaster, FacetMaster and ObjectFacetMapping files when objects are added to or modified in the object repository. The records associated with deleted or previous versions of objects are not affected, but they are no longer pointed to by the ObjectIndex and IndexDocIndex files. Accordingly, the content store files become fragmented over time, resulting in degradation of search response times.

Figure 7A:
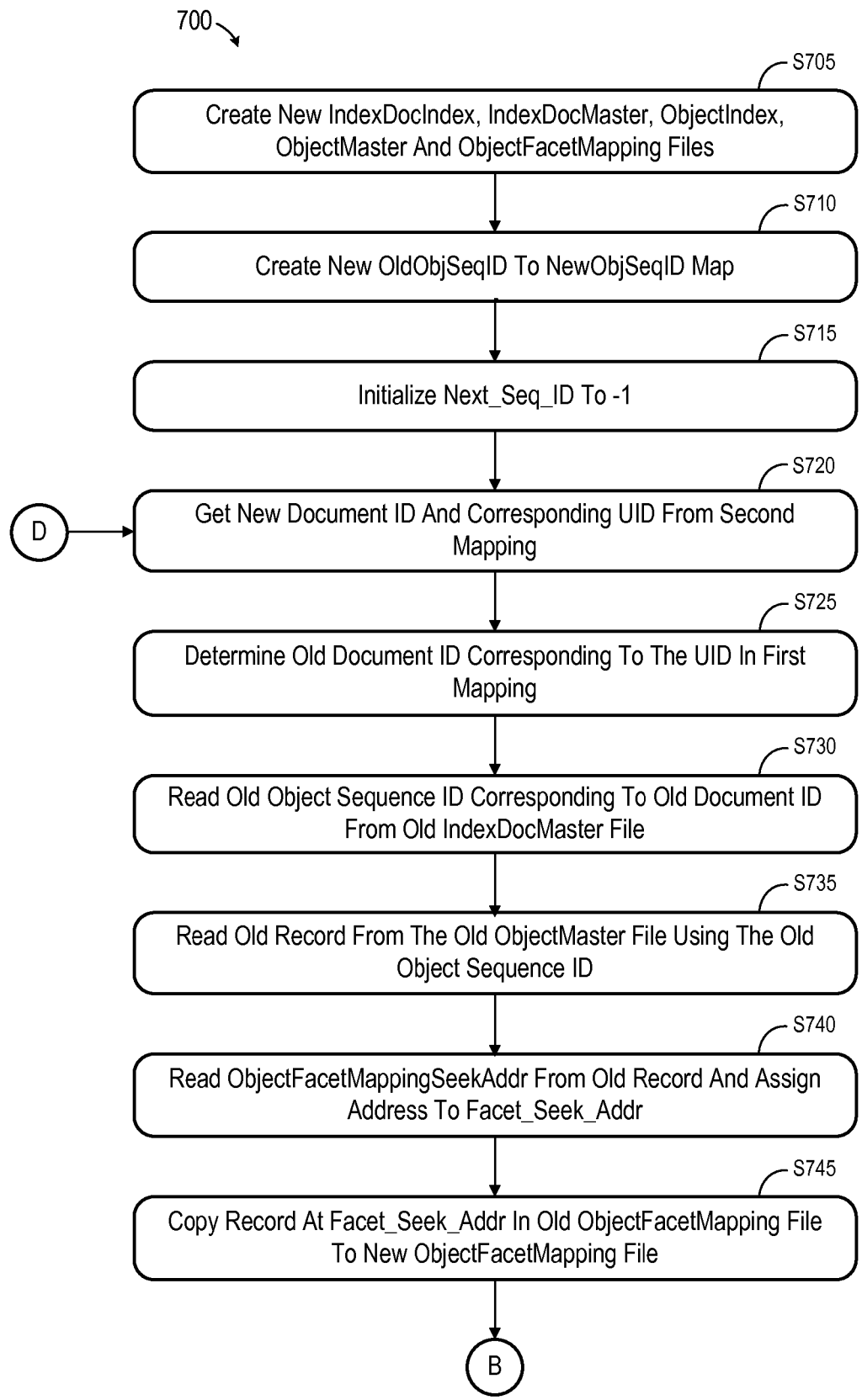
FIGS. 7A through 7C comprise a flow diagram associated with defragmentation of a content store according to some embodiments.
Figure 7B:
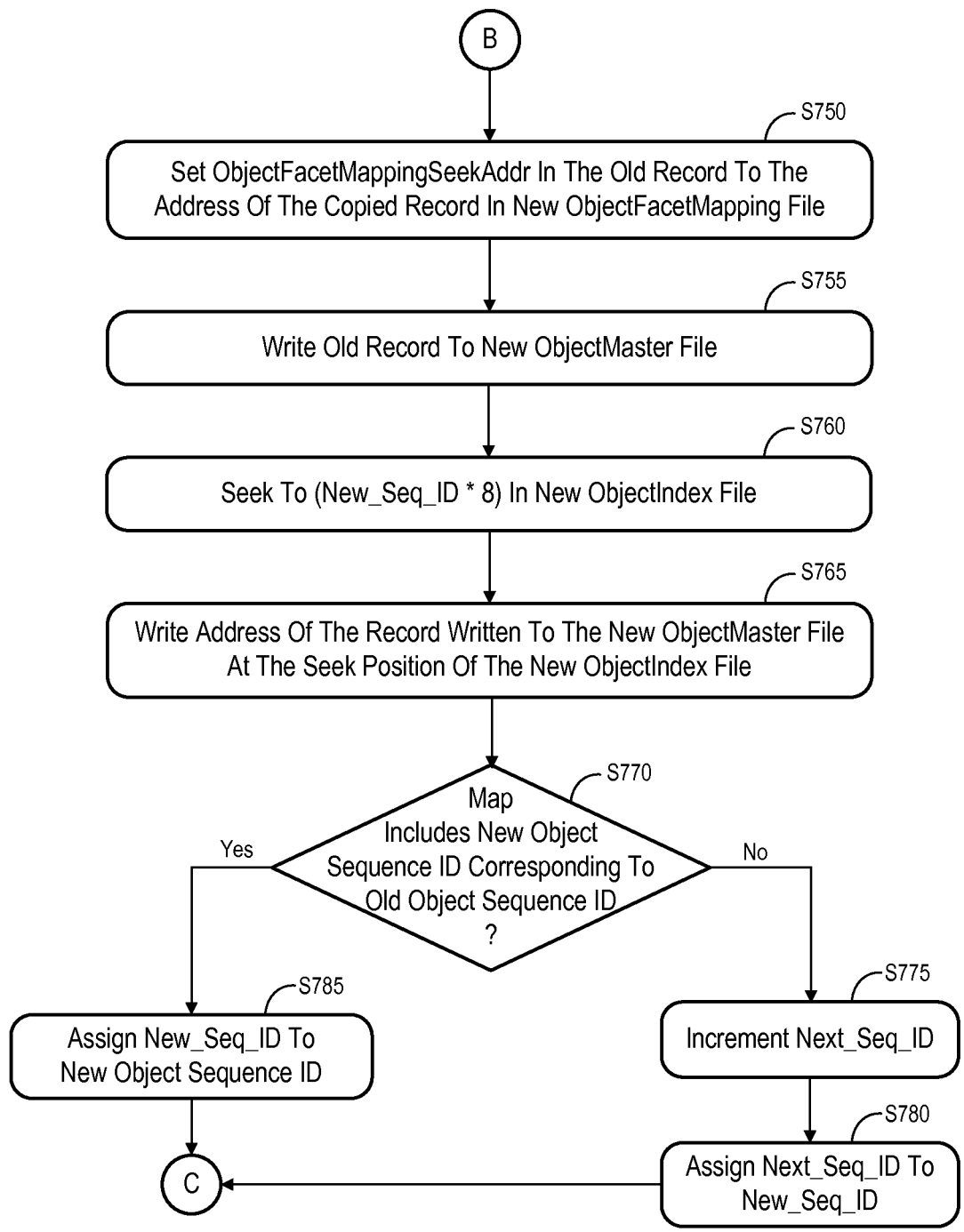
Figure 7C:
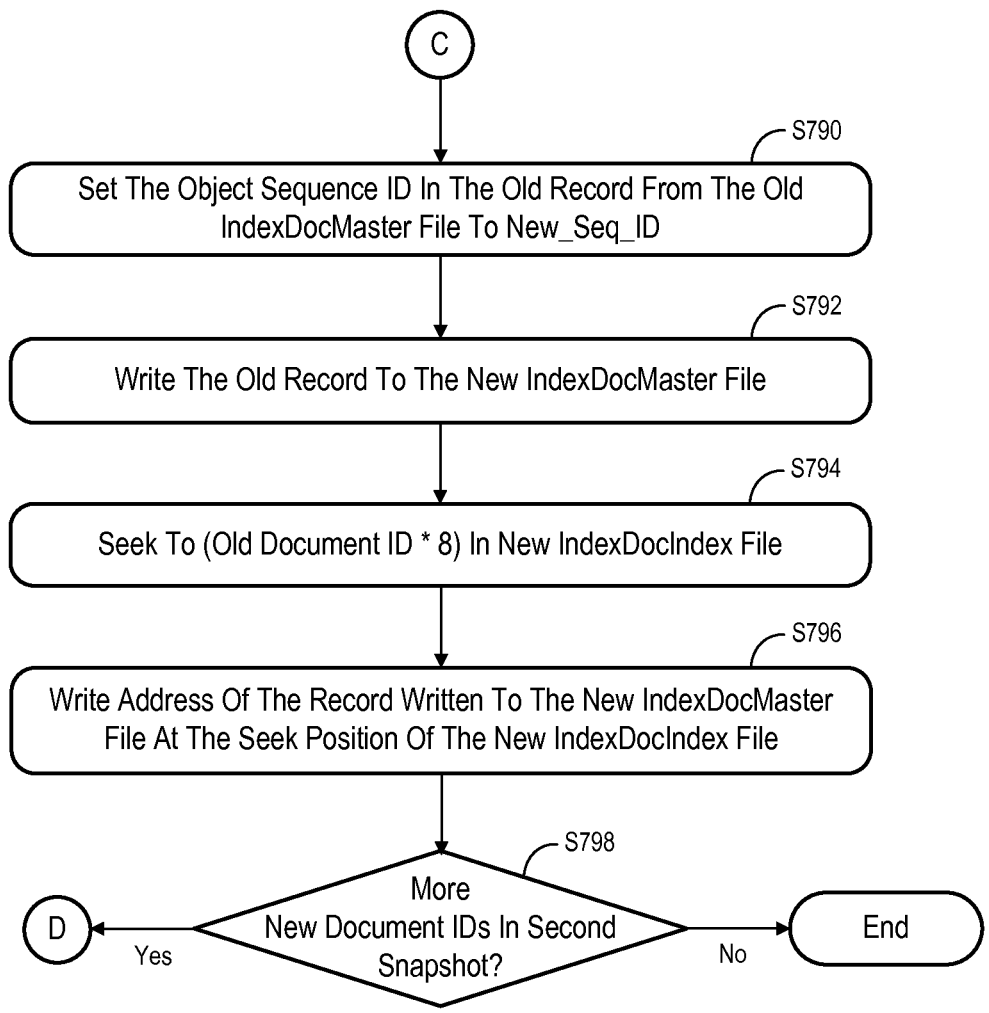

Process 700 of FIGS. 7A through 7C may be executed to defragment a content store according to some embodiments. In some embodiments, a content store is defragmented after its corresponding search index is optimized (e.g., via process 600).

At S705, new IndexDocIndex, IndexDocMaster, ObjectIndex, ObjectMaster and ObjectFacetMapping files are created. Then, at S710, an OldObjSeqID to NewObjSeqID map is created. The variable Next_Seq_ID is initialized to −1 at S715.

After the foregoing preparatory steps are complete, a new document identifier and corresponding UID are retrieved at S720 from the second mapping created during process 600. The second mapping is available because, as described above, process 700 is executed after optimization of the search index.

The retrieved UID is used at S725 to determine, from the first mapping created prior to search index optimization, an old document identifier which corresponds to the retrieved new document identifier. The old document identifier is then used at S730 to identify a corresponding record from the old IndexDocMaster file and to read an old object sequence identifier from the corresponding record. Similarly, an old record from the old ObjectMaster file is read at S735 using the old object sequence identifier.

Specifically, the ObjectFacetMappingSeekAddr is read from the old record of the old ObjectMaster file and assigned to the variable Facet_Seek_Addr at S740. Next, at S745, the record located at Facet_Seek_Addr in the old ObjectFacetMapping file is copied to the new ObjectFacetMapping file. The ObjectFacetMappingSeekAddr of the old record of the ObjectMaster file is set to the address of the record copied in the new ObjectMaster file at S750. Then, this old record is written to the new ObjectMaster file at S755.

At S760, process 700 seeks to (New_Seq_ID*8) in the new ObjectIndex file. The address of the record written at S755 is then written to the seek position of the new ObjectIndex file at S765. It is then determined at S770 whether the mapping created at S710 includes a new object sequence identifier corresponding to the old object sequence identifier. If a new object sequence identifier is not found, the variable Next_Seq_ID is incremented at S775 and the Next_Seq_ID is assigned to New_Seq_ID at S780. If the determination at S770 is affirmative, the new object sequence identifier is assigned the value of New_Seq_ID at S785.

At S790, the object sequence identifier in the old record from the old IndexDocMaster file is set to New_Seq_ID. This old record is then written to the new IndexDocMaster file at S792. After seeking to (old document identifier*8) in the new IndexDocIndex file, the address of the record written at S792 is written to the seek position of the new IndexDocIndex file at S796.

At S798, it is determined whether the second mapping includes more document identifiers (and corresponding UIDs). If so, flow returns to S720 to retrieve a new document identifier and corresponding UID from the second mapping and continue as described above. If not, process 700 terminates.

Some search systems include several search processing nodes. Each search processing node includes a search engine and a copy of the search index. The processing nodes provide scalability of search services and fault-tolerance. A cluster-aware content store is desirable for similar reasons.

Figure 8:
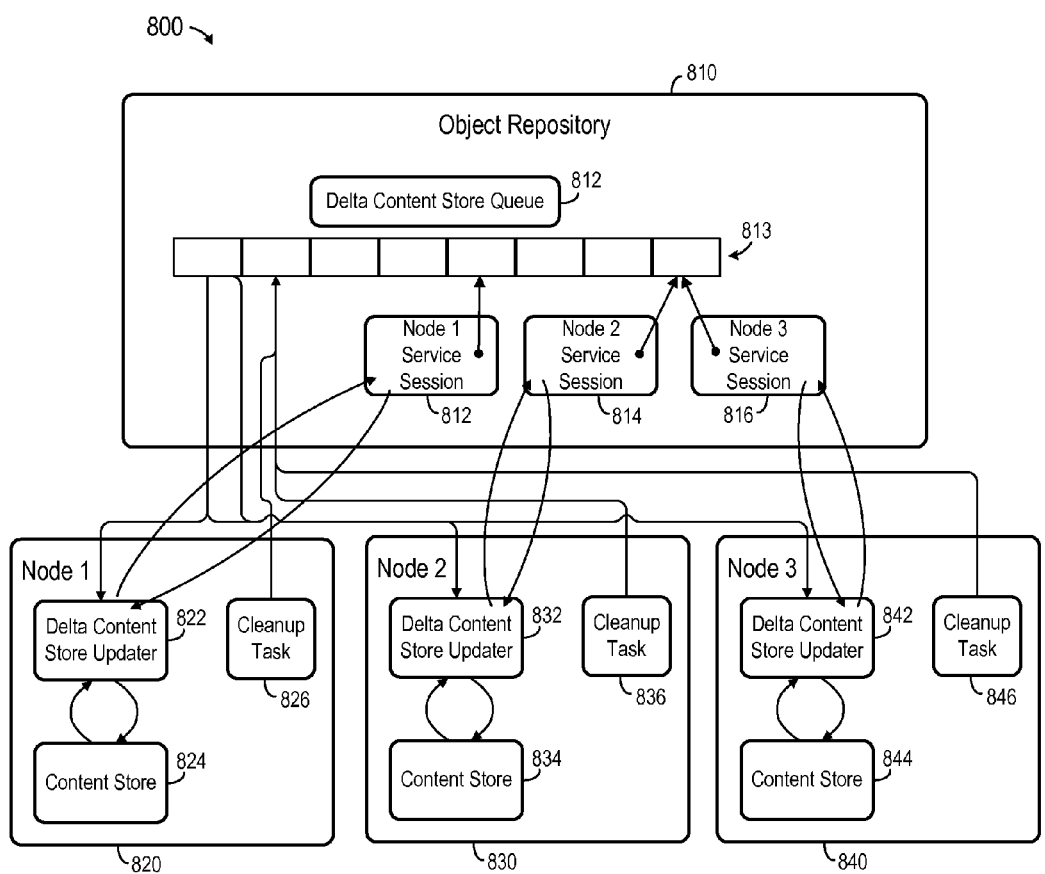
FIG. 8 is a block diagram of a system according to some embodiments.

FIG. 8 is a block diagram of system 800 including object repository 810 and a cluster of processing nodes 820, 830 and 840. Each of nodes 820, 830 and 840 generates and updates a dedicated copy of the content store. When one or more nodes fail, the remaining nodes are available for serving search queries.

Delta content store queue 812 is a global queue visible to all nodes. The delta store content updater (822, 832 and 842) of each node picks up objects 813 from queue 812 and updates a corresponding content store 824, 834 and 844 based thereon (e.g., using process 500).

Each of nodes 820, 830 and 840 maintains a corresponding service session object 814, 815 or 816 in object repository 810. A service session object contains state information associated with its corresponding node. The state information includes attributes such as a timestamp representing the last content store update and the latest content store version. The objects in the delta content store queue are ordered by their update timestamp.

As mentioned above, the delta store content updater (822, 832 and 842) of each node may update its corresponding content store based on techniques described herein. After a successful delta content store update, each node stores the timestamp of its last processed queue object in the node's corresponding service session.

An object in delta content store queue 812 is removed only after being processed by all nodes in the cluster. Cleanup tasks 826, 836 and 846 may perform this removal. For example, a cleanup task of a node may read the last object-processed timestamp from each of service sessions 814, 815 and 816. The earliest timestamp is identified, and all objects from delta content store queue 812 whose timestamps are earlier than the last-processed timestamp are deleted.

Cleanup tasks 826, 836 and 846 coordinate these actions by locking and unlocking delta content store queue 812. Therefore, if one node fails, the cleanup tasks of the other nodes may continue cleaning delta content store queue 812.

Each node maintains its own copy of the content store. If a checksum comparison at the beginning of a content store update (e.g., process 500) indicates that a node's content store is corrupted, the other nodes can continue to serve search requests using their content stores. The affected node does not process search requests until its content store is recovered.

Figure 9:
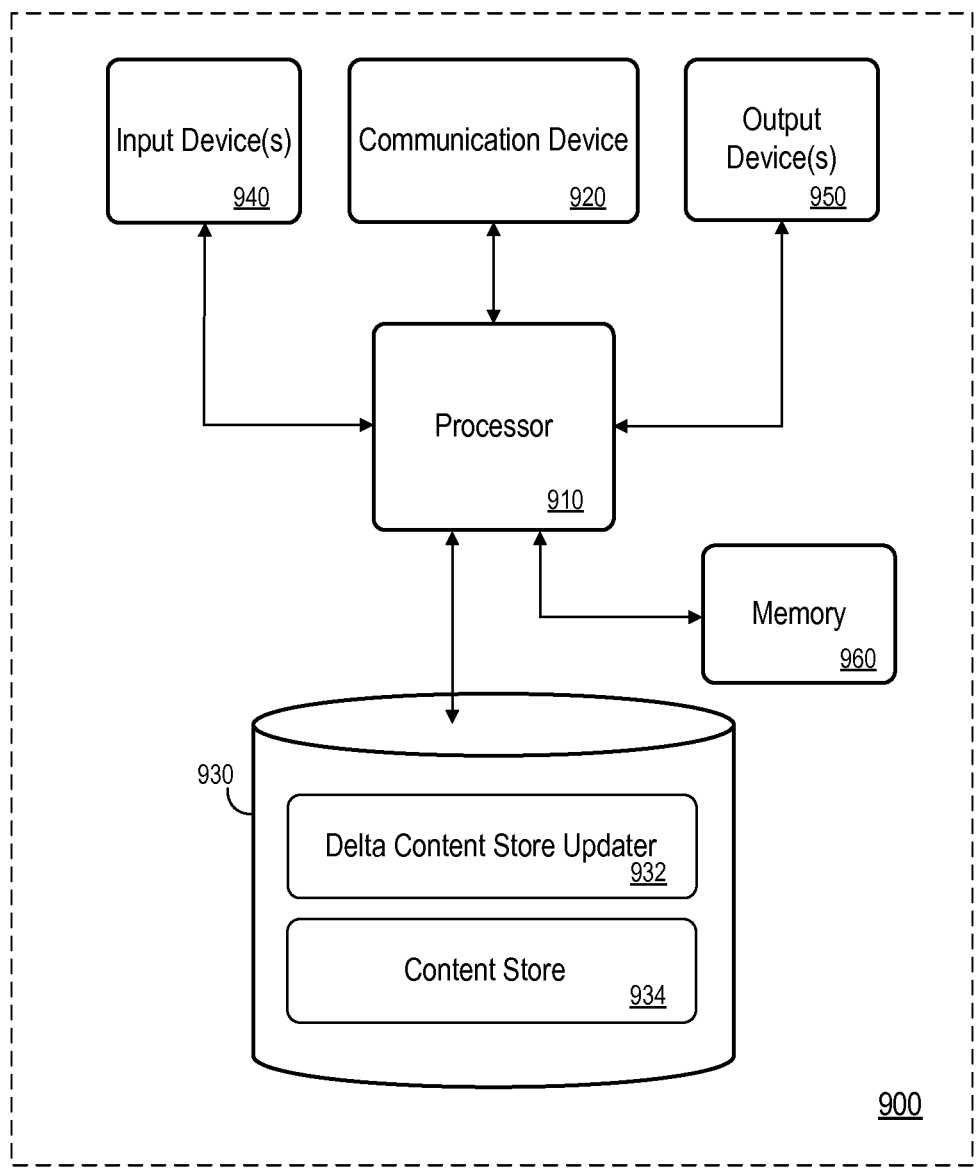
FIG. 9 is a block diagram of an apparatus according to some embodiments.

FIG. 9 is a block diagram of apparatus 900 according to some embodiments. Apparatus 900 may comprise a general-purpose computing apparatus and may execute program code to perform any of the functions described herein. Apparatus 900 may comprise an implementation of search server 130 and/or any of nodes 820, 830 and 840. Apparatus 900 may include other unshown elements according to some embodiments.

Apparatus 900 includes processor 910 operatively coupled to communication device 920, data storage device 930, one or more input devices 940, one or more output devices 950 and memory 960. Communication device 920 may facilitate communication with external devices, such as an object repository. Input device(s) 940 may comprise, for example, a keyboard, a keypad, a mouse or other pointing device, a microphone, knob or a switch, an infra-red (IR) port, a docking station, and/or a touch screen. Input device(s) 940 may be used, for example, to enter information into apparatus 900. Output device(s) 950 may comprise, for example, a display (e.g., a display screen) a speaker, and/or a printer.

Data storage device 930 may comprise any appropriate persistent storage device, including combinations of magnetic storage devices (e.g., magnetic tape, hard disk drives and flash memory), optical storage devices, Read Only Memory (ROM) devices, etc., while memory 960 may comprise Random Access Memory (RAM).

Program code of delta content store updater 932 may be executed by processor 910 to cause apparatus 900 to perform any one or more of the processes described herein. Embodiments are not limited to execution of these processes by a single apparatus. Content store 934 may include any type of data structures of information associated with object, including but not limited to flat files conforming to schema 200. Data storage device 930 may also store data and other program code for providing additional functionality and/or which are necessary for operation thereof, such as device drivers, operating system files, etc.

The foregoing diagrams represent logical architectures for describing processes according to some embodiments, and actual implementations may include more or different components arranged in other manners. Moreover, each system described herein may be implemented by any number of devices in communication via any number of other public and/or private networks. Two or more devices of may be located remote from one another and may communicate with one another via any known manner of network(s) and/or a dedicated connection. Moreover, each device may comprise any number of hardware and/or software elements suitable to provide the functions described herein as well as any other functions. Other topologies may be used in conjunction with other embodiments.

All systems and processes discussed herein may be embodied in program code stored on one or more computer-readable media. Such media may include, for example, a floppy disk, a CD-ROM, a DVD-ROM, a Flash drive, magnetic tape, and solid state Random Access Memory (RAM) or Read Only Memory (ROM) storage units. Embodiments are therefore not limited to any specific combination of hardware and software.

The embodiments described herein are solely for the purpose of illustration. Those in the art will recognize that other embodiments may be practiced with modifications and alterations limited only by the claims.

What is claimed is:

1. A method implemented by a computer in response to execution of program code by a processor of said computer, the method comprising:
   determining second document identifiers added to a search index, the search index associating each of a plurality of words with at least one of a plurality of first document identifiers;
   determining at least one of the first document identifiers of the search index corresponding to one of a modified document and a deleted document;
   for each determined first document identifiers, setting a seek address to a predetermined value as a flag indicating that the modified document or the deleted document is excluded from a search result;
   for each of the second document identifiers, adding metadata of a document identified by the second document identifier to a content store storing metadata of each document identified by the plurality of first document identifiers;
   adding a document identifier to a delta content store queue each time a document is indexed in the search index; and
   updating the content store based on the delta content store queue without regenerating the content store each time the search index is updated.

2. A method according to claim 1, wherein the content store comprises at least one flat file, and wherein adding metadata of a document identified by a second document identifier comprises:
   appending the metadata to an end of one or more of the at least one flat file.

3. A method according to claim 1, further comprising
   removing metadata of the deleted document from the content store.

4. A method according to claim 1, further comprising:
   determining that the search index has been defragmented to generate a plurality of third document identifiers; and
   updating the content store to associate the metadata of the content store with the plurality of third document identifiers.

5. A method according to claim 1, further comprising:
   defragmenting the content store.

6. A method according to claim 1, wherein determining the second identifiers comprises determining the second identifiers from an object in an update queue, the method further comprising:
deleting the object from the update queue after adding the metadata.

7. A method according to claim 6, wherein deleting the object comprises:
after adding the metadata, determining whether the object has been processed by all other content store processing nodes; and
deleting the object from the update queue if it is determined that the object has been processed by all other content store processing nodes.

8. A non-transitory computer-readable medium having stored thereon program code, the program code executable by a computer to:
determine second document identifiers added to a search index, the search index associating each of a plurality of words with at least one of a plurality of first document identifiers;
determine at least one of the first document identifiers of the search index corresponding to one of a modified document and a deleted document;
for each determined first document identifiers, set a seek address to a predetermined value as a flag indicating that the modified document or the deleted document is excluded from a search result;
for each of the second document identifiers, add metadata of a document identified by the second document identifier to a content store storing metadata of each document identified by the plurality of first document identifiers;
adding a document identifier to a delta content store queue each time a document is indexed in the search index; and
updating the content store based on the delta content store queue without regenerating the content store each time the search index is updated.

9. A non-transitory computer-readable medium according to claim 8, wherein the content store comprises at least one flat file, and wherein addition of the metadata of the document identified by a second document identifier comprises:
appending of the metadata to an end of one or more of the at least one flat file.

10. A non-transitory computer-readable medium according to claim 8, the program code further executable by a computer to
remove metadata of the deleted document from the content store.

11. A non-transitory computer-readable medium according to claim 8, the program code further executable by a computer to:
determine that the search index has been defragmented to generate a plurality of third document identifiers; and
update the content store to associate the metadata of the content store with the plurality of third document identifiers.

12. A non-transitory computer-readable medium according to claim 8, the program code further executable by a computer to:
defragment the content store.

13. A non-transitory computer-readable medium according to claim 8, wherein determination of the second identifiers comprises determination of the second identifiers from an object in an update queue, the program code further executable by a computer to:
delete the object from the update queue after adding the metadata.

14. A non-transitory computer-readable medium according to claim 13, wherein deletion of the object comprises:
after addition of the metadata, determination of whether the object has been processed by all other content store processing nodes; and
deletion of the object from the update queue if it is determined that the object has been processed by all other content store processing nodes.

15. A system comprising:
a first electronic storage element storing a search index associating each of a plurality of words with at least one of a plurality of first document identifiers;
a second electronic storage element storing a content store comprising metadata of each document identified by the plurality of first document identifiers; and
a device comprising a processor to:
determine at least one of the first document identifiers of the search index corresponding to one of a modified document and a deleted document;
for each determined first document identifiers, set a seek address to a predetermined value as a flag indicating that the modified document or the deleted document is excluded from a search result;
determine second document identifiers added to the search index;
for each of the second document identifiers, add metadata of a document identified by the second document identifier to the content store;
adding a document identifier to a delta content store queue each time a document is indexed in the search index; and
updating the content store based on the delta content store queue without regenerating the content store each time the search index is updated.

16. A system according to claim 15, wherein the content store comprises at least one flat file, and wherein adding metadata of a document identified by a second document identifier comprises:
appending the metadata to an end of one or more of the at least one flat file.

17. A system according to claim 15, the device further to remove metadata of the deleted document from the content store.

18. A system according to claim 15, the device further to:
determine that the search index has been defragmented to generate a plurality of third document identifiers; and
update the content store to associate the metadata of the content store with the plurality of third document identifiers.

19. A system according to claim 15, the device further to:
defragment the content store.

20. A system according to claim 15, wherein determining the second identifiers comprises determining the second identifiers from an object in an update queue, the device further to:
delete the object from the update queue after adding the metadata.

21. A system according to claim 20, wherein deleting the object comprises:
after adding the metadata, determining whether the object has been processed by all other content store processing nodes; and
deleting the object from the update queue if it is determined that the object has been processed by all other content store processing nodes.

* * * * *

UNITED STATES PATENT AND TRADEMARK OFFICE
CERTIFICATE OF CORRECTION

PATENT NO. : 8,527,556 B2  
APPLICATION NO. : 12/890939  
DATED : September 3, 2013  
INVENTOR(S) : Ganesh Vaitheeswaran, Arindam Bhattacharjee and Raghavendra Reddy Bijjula Page 1 of 1

It is certified that error appears in the above-identified patent and that said Letters Patent is hereby corrected as shown below:

Title Page

Item (75) Inventors:

2nd named inventor should read as: "Arindam Bhattacharjee", Bangalore (IN)

Signed and Sealed this
Twelfth Day of November, 2013

Teresa Stanek Rea
*Deputy Director of the United States Patent and Trademark Office*